United States Patent
Lin et al.

(10) Patent No.: US 9,343,745 B1
(45) Date of Patent: May 17, 2016

(54) SURFACE PASSIVATION OF ACTIVE MATERIAL PARTICLES FOR USE IN ELECTROCHEMICAL CELLS

(71) Applicant: A123 Systems, LLC, Waltham, MA (US)

(72) Inventors: Tzu-Yuan Lin, San Jose, CA (US); Marc Juzkow, Livermore, CA (US); Francisco Madulid, Castro Valley, CA (US); Junghyun Kim, Hayward, CA (US)

(73) Assignee: A123 Systems LLC, Waltham, MA (US)

( * ) Notice: Subject to any disclaimer, the term of this patent is extended or adjusted under 35 U.S.C. 154(b) by 182 days.

(21) Appl. No.: 14/175,944

(22) Filed: Feb. 7, 2014

Related U.S. Application Data

(60) Provisional application No. 61/762,142, filed on Feb. 7, 2013.

(51) Int. Cl.

| | |
|---|---|
| *H01M 4/13* | (2010.01) |
| *H01M 4/62* | (2006.01) |
| *C23C 8/60* | (2006.01) |
| *H01M 4/1393* | (2010.01) |
| *H01M 4/133* | (2010.01) |
| *H01M 4/131* | (2010.01) |
| *H01M 10/056* | (2010.01) |

(52) U.S. Cl.
CPC ............... *H01M 4/628* (2013.01); *C23C 8/60* (2013.01); *H01M 4/1393* (2013.01); *H01M 4/625* (2013.01); *H01M 4/131* (2013.01); *H01M 4/133* (2013.01); *H01M 10/056* (2013.01)

(58) Field of Classification Search
CPC . H01M 4/0416; H01M 4/0478; H01M 4/048; H01M 4/13; H01M 4/131; H01M 4/133; H01M 4/137; H01M 4/1391; H01M 4/1393; H01M 4/624; H01M 4/625; H01M 4/663; H01M 4/666; H01M 4/668; H01M 10/056
See application file for complete search history.

(56) References Cited

U.S. PATENT DOCUMENTS

| | | | | |
|---|---|---|---|---|
| 2005/0238958 A1* | 10/2005 | Kim | .................. | H01M 4/13 429/217 |
| 2012/0058397 A1* | 3/2012 | Zhamu | .................. | H01M 4/13 429/231.8 |
| 2012/0156565 A1* | 6/2012 | Kim | .................. | H01M 4/0471 429/221 |

(Continued)

*Primary Examiner* — Patrick Ryan
*Assistant Examiner* — Ben Lewis
(74) *Attorney, Agent, or Firm* — Alleman Hall McCoy Russell & Tuttle LLP

(57) ABSTRACT

Provided are methods of passivating active materials for use in electrochemical cells as well as active materials and cell components prepared using such methods. Active material particles may be combined with passivating material particles, and this combination may be mixed together using high shear mixing. The mixed combination may not include any solvents or binders. As such, drying mixing may be performed on this combination of the active material particles and passivating material particles. A passivating layer is formed on the active material particles during mixing. This passivating layer later prevents direct contact between the active material particles and the electrolyte while still allowing ionic exchange. Furthermore, the passivating layer may increase electronic conductivity between active material particles in an electrode. The passivating layer may be mechanically bonded to the surface of the active material particles rather than chemically bonded.

20 Claims, 7 Drawing Sheets

(56) References Cited

U.S. PATENT DOCUMENTS

2012/0264009 A1 * 10/2012 Kim .................. H01M 4/131
  428/188

2013/0189583 A1 * 7/2013 Lee ..................... H01M 4/38
  429/231.1

* cited by examiner

SURFACE PASSIVATION OF ACTIVE MATERIAL PARTICLES FOR USE IN ELECTROCHEMICAL CELLS

CROSS-REFERENCE TO RELATED APPLICATIONS

This application claims the benefit under 35 U.S.C. §119 (e) of U.S. Provisional Patent Application 61/762,142, entitled: "SURFACE PASSIVATION OF ACTIVE MATERIAL PARTICLES FOR USE IN ELECTROCHEMICAL CELLS," filed on 7 Feb. 2013, which is incorporated herein by reference in its entirety.

BACKGROUND

Some surface activity of active materials used in positive and negative electrodes of electrochemical cells, such as lithium batteries, can have deleterious effects. For example, electrolytes may decompose on surfaces of negative electrodes and/or positive electrodes. This decomposition may be due to the catalytic activity of the electrode active material surfaces, high electrical potential at these surfaces, and/or a presence of specific functional groups (e.g., hydroxyl and oxygen groups) on the surfaces. This electrolyte decomposition and other undesirable electrode surface reactions may result in an increased cell resistance, which in turn causes capacity fade and poor rate performance. Furthermore, substantial gas generation may occur inside a sealed case and cause swelling and potentially unsafe conditions. Many positive electrode materials and negative electrode materials can exhibit such deleterious activity. Nickel containing materials and titanium containing materials, such as lithium titanium oxide (LTO), are particularly prone to gas generation when used with many different electrolytes.

SUMMARY

Provided are methods of passivating active materials for use in electrochemical cells as well as active materials and cell components prepared using such methods. Active material particles may be combined with passivating material particles, and this combination may be mixed together using high shear mixing. The mixed combination may not include any solvents or binders. As such, drying mixing may be performed on this combination of the active material particles and passivating material particles. A passivating layer is formed on the active material particles during mixing. This passivating layer later prevents direct contact between the active material particles and the electrolyte while still allowing ionic exchange. Furthermore, the passivating layer may increase electronic conductivity between active material particles in the electrodes. The passivating layer may be mechanically bonded to the surface of the active material particles rather than chemically bonded.

In some embodiments, a method of passivating active materials for use in electrochemical cells involves combining active material particles and passivating material particles. The active material particles include one or more of the following materials: lithium titanate ($Li_4Ti_5O_{12}$), lithium cobalt oxide ($LiCoO_2$), lithium nickel cobalt aluminum oxide ($LiNi_{0.85}Co_{0.1}Al_{0.05}O_2$), lithium nickel cobalt manganese oxide ($LiNi_{1/3}Co_{1/3}Mn_{1/3}O_2$), lithium manganese oxide ($LiMn_2O_4$), lithium iron phosphate ($LiFePO_4$), lithium manganese iron phosphate, lithium cobalt phosphate, spinel lithium nickel manganese oxide, layered lithium nickel manganese oxide, lithium- and manganese-rich transition metal layered-oxides (LMR-NMC), and lithium iron silicate ($Li_2FeSiO_4$). In some embodiments, the active material particles include lithium titanate ($Li_4Ti_5O_{12}$). The method may proceed with mixing a combination of the active material particles and the passivating material using high shear mixing. The combination of the active material particles and the passivating material particles has a solid content of at least about 99% during mixing. Furthermore, mixing forms a passivating layer on the active material particles. The passivating layer includes a material of the passivating material particles.

The passivating material particles may include one or more of the following materials: a carbon-containing material, a ceramic, and a polymer. In some embodiments, the passivating material particles include one or more of the following carbon-containing materials: carbon black, activated carbon, hard carbon, soft carbon, meso carbon micro beads (MCMB), graphite, graphene, and carbon nanotubes (CNT). For example, the passivating material particles may include graphene nano-plates. In some embodiments, the passivating material particles include one or more carbon-containing materials having one or more of the following morphology structures: a needle-like structure, a plate-like structure, a spherical structure, and an irregular structure. The passivating material particles may include one or more of the following ceramic materials: aluminum oxide ($Al_2O_3$), silicon oxide ($SiO_2$), titanium oxide ($TiO_2$), and molybdenum oxide ($MoO_3$). In some embodiments, the passivating material particles include one or more polymers having a main chain length of at least about 50,000. For example, the passivating material particles may include one or more of the following polymers: polypropylene (PP), polyethylene (PE), polyvinyl chloride (PVC), polyvinyl acetate (PVA), poly acrylic acid (PAA), and poly acrylonitrile (PAN).

In some embodiments, the passivating material particles have a two-dimensional shape. For purposes of this disclosure, the two dimensional shape is defined as a shape having two of its dimensions being substantially larger (e.g., at least 5 times larger) than the remaining third dimension. Some examples of two-dimensional shapes include flakes and plates. The two-dimensional shape should be distinguished from one-dimensional shapes (e.g., rods, wires) or three-dimensional shapes (e.g., spheres).

In some embodiments, the combined average surface area of the active material particles and the passivating material particles is reduced during mixing. This reduction is attributed to the passivating material particles forming a passivating layer on the active material particles. For example, when the active material particles are completely enclosed with the passivating layer, these particles do not contribute to the combined average surface area after mixing. Some changes in the surface area may be also attributed to changes in shape of these particles. In some embodiments, the combined average surface area of the active material particles and the passivating material is reduced by at least about 5 times during mixing.

In some embodiments, the weight ratio of the passivating material particles relative to the active material particles in the combination is between about 0.01 and 0.1. In general, the amount of the passivating material particles in the mixture should be minimized, for example, if contribution of the passivating material particles to the capacity is less than the capacity of the active material particles at an operating voltage range or if the passivating material particles have other less desirable properties than the active material particles.

In some embodiments, the total surface ratio of the passivating material particles relative to the active material particles, prior to mixing, is between about 1 and 5 or, more specifically, between about 2 and 4. In order to completely cover the active material particles with passivating material particles having two-dimensional shapes (e.g., flat passivating material particles), this total surface ratio needs to be at least 2. In other words, the total surface ratio of the passivating material particles needs to be twice larger than the total surface ratio of the active material particles since at least a half of the total surface ratio of the passivating material particles will form an interface with the total surface ratio of the active material particles and the other half will form a new surface area.

In some embodiments, the high shear mixing is performed using a set of three blades, which includes a top blade, a bottom blade, and a middle blade, disposed between the top blade and the bottom blade. The top blade in the set directs the active material particles and the passivating material particles toward the bottom blade during the high shear mixing. The bottom blade in the set directs the active material particles and the passivating material particles to the top blade during the high shear mixing. Finally, the middle blade exerts a shear force on the active material particles and the passivating material particles during the high shear mixing. In some embodiments, the high shear mixing involves one or more of the following techniques: dry-blending, ball milling, jet milling, three roller milling, grinding, attrition milling, and cryomilling.

In some embodiments, the method also involves, after mixing the combination of the active material particles and the passivating material using high shear mixing, adding a polymer binder to the combination, thereby forming slurry. The method may also involve coating the slurry on a current collector substrate. In some embodiments, a carbon-containing material is added to the combination after mixing in order to form the slurry.

Provided also is a passivated active material including active material particles formed from lithium titanate ($Li_4Ti_5O_{12}$). The passivated active material also includes a passivating layer disposed on the surface of the active material particles. The passivating layer includes a carbon-containing material. The weight ratio of the passivating layer to the active material particles is between about 0.01 and 0.1.

These and other embodiments are described further below with reference to the figures.

DETAILED DESCRIPTION

Figure 1:
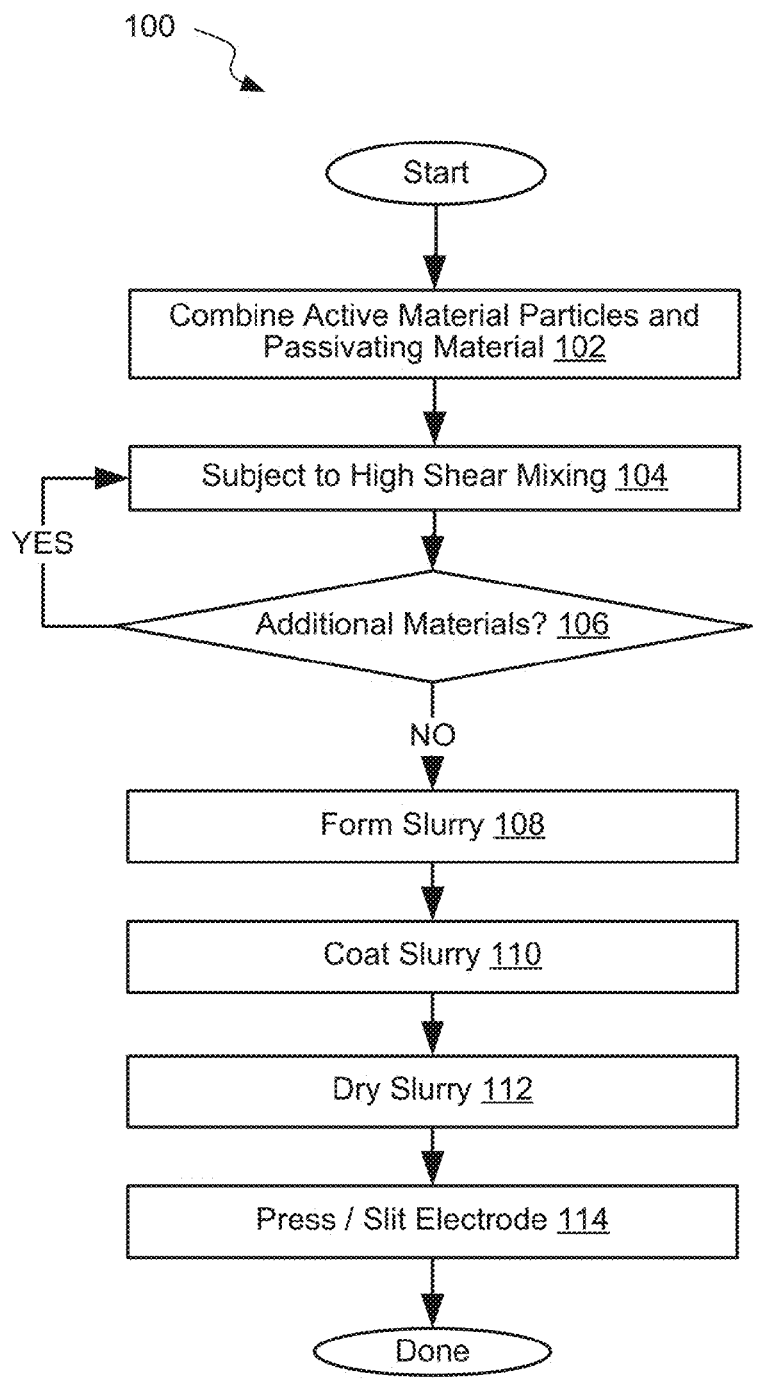
FIG. 1 illustrates a process flowchart corresponding to a method of passivating active materials for use in electrochemical cells, in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

INTRODUCTION

Rechargeable batteries or, more specifically, rechargeable electrochemical cells, are used for various applications, such as portable electronics, power tools, and vehicles. These cells need to operate in an efficient and safe manner. One performance and safety concern with many types of cells is internal gas generation, sometimes referred to as gassing. This phenomenon may be attributed to decomposition of electrolyte components, such as carbonate solvents, at electrode surfaces. The electrodes include active material particles and other components, such as conductive additive and polymer binders. These components, in particular, active material particles, may not only catalyze the decomposition reaction but may also subject the interface with electrolyte to high voltages. Some examples of active materials include lithium titanate ($Li_4Ti_5O_{12}$), lithium cobalt oxide ($LiCoO_2$), lithium nickel cobalt aluminum oxide ($LiNi_{0.85}Co_{0.1}Al_{0.05}O_2$), lithium nickel cobalt manganese oxide ($LiNi_{1/3}Co_{1/3}Mn_{1/3}O_2$), lithium manganese oxide ($LiMn_2O_4$), lithium iron phosphate ($LiFePO_4$), lithium manganese iron phosphate, lithium cobalt phosphate, spinel lithium nickel manganese oxide, layered lithium nickel manganese oxide, lithium- and manganese-rich transition metal layered-oxides (LMR-NMC), and lithium iron silicate ($Li_2FeSiO_4$).

Lithium titanate, represented by the formula $Li_4Ti_5O_{12}$ (or $Li_{4/3}Ti_{5/3}O_4$), is one of the most promising materials for negative electrodes of lithium ion cells and lithium polymer cells. Lithium titanate may have varying ratios of lithium to titanium, such as $Li_xTi_yO_4$, wherein $0.8 \leq X \leq 1.4$ and $1.6 \leq Y \leq 2.2$ or $X+Y \sim 3$. The lithium titanate may be a stoichiometric or have a defect spinel configuration. In the defect spinel configuration, the distribution of lithium can vary. Lithium titanate has an excellent cycle life due to uniquely low volume change during charge and discharge resulting from a cubic spinel structure of the material. The lattice parameter of the cubic spinel structure (cubic, Sp. Gr. Fd-3m (227)) varies from 8.3595 Angstroms to 8.3538 Angstroms for extreme states during charging and discharging. This linear parameter change is equal to a volume change of about 0.2%. Lithium titanate has an electrochemical potential versus elemental lithium of about 1.55 V and can be intercalated with lithium to produce an intercalated lithium titanate represented by the formula $Li_7Ti_5O_{12}$. The intercalated lithium titanate has a theoretical capacity of about 175 mAh/g.

Lithium titanate also has a flat discharge curve. The charge and discharge processes of this active material are believed to take place in a two-phase system. $Li_4Ti_5O_{12}$ has a spinel structure and, during charging, transforms into $Li_7Ti_5O_{12}$, which has an ordered rock-salt type structure. As a result, the electric potential during the charge and discharge processes is determined by electrochemical equilibrium between $Li_4Ti_5O_{12}$ and $Li_7Ti_5O_{12}$ and is not dependent on the lithium concentration. This is in contrast to the discharge curve of most other electrode materials for lithium power sources, which maintain their structure during the charge and discharge processes. For example, a structural transition of a charged phase in most positive active materials, such as $LiCoO_2$, is pre-determined. However, there is still an extended limit of variable composition of $Li_xCoO_2$ between various structures that it can take. As a result, the electrical potential of such materials depends on the lithium concentration in the active materials or, in other words, a state of charge or discharge. Thus, a discharge curve in materials in which the electrical potential is dependent on the lithium concentration in the material is typically inclined and is often a step-like curve.

Furthermore, lithium titanate has a low intrinsic electronic conductivity and lithium-ion diffusion coefficient, which may negatively impact high-rate charge/discharge capabilities. Doping and combining with other more conductive materials, such as carbon, may help to improve the electrochemical performance of this material.

However, lithium titanate is known for severe gassing during charge/discharge cycles and storage, especially at elevated temperatures. The gas generated inside the lithium titanate containing cells may include $H_2$, $CO_2$, and CO and may be derived from traces of water and decomposition of electrolyte components. Specifically, gassing may originate from interfacial reactions between lithium titanate and surrounding alkyl carbonate solvents. According to one theory, the reactions occur at the interface of the surface of the lithium titanate (111) plane, which results in transformation from a (111) to (222) plane and formation of a (101) plane of anatase titanium oxide.

Without being restricted to any particular theory, the gassing process may involve absorption of solvent molecules on the surface of lithium titanate particles. It is believed that weak bonds may be formed between oxide groups of lithium titanate and hydrogen of the solvent molecules. The overall gassing process may continue with reduction of hydroxyl groups and release of hydrogen gas followed by chemical decomposition of the solvent molecules.

Coating of the surface of lithium titanate particles and other active materials prone to gassing is generally considered to be a promising way of solving the gassing issue. Various passivating material can be used, such as carbon-containing materials, ceramics, and polymers. While some of these materials are currently used and combined with active material particles, such as lithium titanate particles, to form slurries, such combinations proved to be ineffective. For example, when carbon is simply added into slurry together with lithium titanate particles, mixing of the slurry does not provide adequate distribution of the carbon around the lithium titanate particles. Without being restricted to any particular theory, it is believed that carbon particles mostly remain as independent structures in the slurry and in the resulting active material layers of electrodes rather than coating and passivating the surface of the lithium titanate particles. As a result, a large portion of gas generating surfaces of the lithium titanate particles becomes exposed to electrolytes after the assembly of the cells. Furthermore, dispersion of carbon materials and contact of the carbon materials with lithium titanate is hindered by the presence of solvents and polymers. Without being restricted to any particular theory, it is believed that the solvents and polymers or, more generally, any liquids, substantially reduce the shearing effect of the mixing and prevent contact between active material particles and passivating material particles during mixing.

Coating of active material titanate particles with passivating materials before the slurry-making process provides better gassing results, but current methods, such as chemical vapor deposition and pyrolysis, are typically slow, expensive, and hard to integrate into battery manufacturing processes. For example, chemical vapor deposition requires special equipment and chemical precursors. Pyrolysis of organic coatings often leaves undesirable residues and does not provide adequate and through coating.

Provided are methods for passivating or, more generally, conditioning active materials for use in electrochemical cells. These methods use high shear mixing of dry particles (e.g., active material particles and passivating material particles without any liquids (such as solvents and dissolved polymer binders) added into the mixture). FIG. 1 illustrates a process flowchart corresponding to one such method 100, in accordance with some embodiments. Method 100 may commence with combining active material particles and passivating material particles during operation 102. The particles may be combined in a mixing container. For example, the active material particles and the passivating material particles may be weighed according to a predetermined recipe. It should be noted that additional materials (additional active material particles, additional passivating material particles, and/or other materials) may be added to the container at a later time (e.g., after initial mixing). In other words, high shear mixing may be initiated using only a subset of all materials and then continued with additional materials.

Examples of active material particles include lithium titanate ($Li_4Ti_5O_{12}$), lithium cobalt oxide ($LiCoO_2$), lithium nickel cobalt aluminum oxide ($LiNi_{0.85}Co_{0.1}Al_{0.05}O_2$), lithium nickel cobalt manganese oxide ($LiNi_{1/3}Co_{1/3}Mn_{1/3}O_2$), lithium manganese oxide ($LiMn_2O_4$), lithium iron phosphate ($LiFePO_4$), lithium manganese iron phosphate, lithium cobalt phosphate, spinel lithium nickel manganese oxide, layered lithium nickel manganese oxide, lithium- and manganese-rich transition metal layered-oxides (LMR-NMC), and lithium iron silicate ($Li_2FeSiO_4$). It should be noted that more materials than lithium titanate may benefit from combining the active material with passivating material. Other materials may benefit due to the formation of more effective surface films, improved electrode conductivity due to lower particle-to-particle resistance, and other reasons.

Examples of the passivating material particles include various carbon-containing materials (e.g., carbon black, activated carbon, hard carbon, soft carbon, meso carbon micro beads (MCMB), graphite, graphene, and carbon nanotubes (CNT)), ceramics (e.g., aluminum oxide ($Al_2O_3$), silicon oxide ($SiO_2$), titanium oxide ($TiO_2$), and molybdenum oxide ($MoO_3$)), and polymers (polypropylene (PP), polyethylene (PE), polyvinyl chloride (PVC), polyvinyl acetate (PVA), poly acrylic acid (PAA), and poly acrylonitrile (PAN)). One or more polymers used as passivating materials may have a main chain length of at least about 50,000. Carbon-containing materials used as passivating materials may have the following morphology structures: a needle-like structure, a plate-like structure, a spherical structure, and an irregular structure.

In some embodiments, the weight ratio of the passivating material particles relative to the active material particles in the combination is between about 0.01 and 0.1 or, more specifically, between 0.02 and 0.08. Another way of representing the relative amounts of these two materials is using a weight ratio of the passivating material particles relative to the combination of the active material particles and the passivating material particles. In some embodiments, this ratio during the high shear mixing is between about 1% and 20% or, more specifically, between about 1% and 10% or even between 1% and 5%. The weight ratio depends on the surface area of the material being coated, particle size, and other properties of the passivating material. Active materials with higher particle size and lower surface area require less passivating material. The morphology of the passivating material also has a significant effect on the amount of the passivating material needed to sufficiently cover the surface of the active material. For example, graphene has high surface area flake-like particles and so a significantly smaller amount of it is required to largely cover the surface of an active material compared to the dense and spherical particles of alumina or zirconia. In some embodiments, at least about 30% of the active material is covered by passivating material or, more specifically, at least about 50% and even at least 70% is covered.

The process may continue with mixing the provided combination of the active material particles and the passivating material particles using high shear mixing during operation 104. During this mixing, no liquids are present in the mixing container. Specifically, the combination of the active material particles and the passivating material particles may have a solid content of at least about 99%.

Mixing may be performed using a high speed mixer, such as a three-blade mixer. A specific example the three-blade mixer is the FML-100 available from Henschel America, Inc. in Green Bay, Wis. The rotational speed for high speed mixing may be between about 2,000 RPM and 6,000 RPM, such as about 4,200 RPM. Operation 104 may proceed for less than 20 minutes, such as between about 1 minute and 15 minutes. Even such a short period of time is sufficient to achieve adequate dispersion of the two materials and coating of the passivating materials onto the active material particles.

High shear mixing during operation 104 forms a material mixture (or blend) substantially free of liquids. In some embodiments, this mixture does not have any other components (i.e., any components other than the active material and the passivating material). In some embodiments, materials other than the active material and the passivating material may be present in the container during mixing. The additional components may include polymers or polymer precursors (monomers, dimers, etc.). These materials may be added to improve bonding between the active material particles and the passivating material and may be referred to as binding agents. In some embodiments, dry mixing of the components is followed by thermal treatment to further increase the bonding between the particles by allowing the polymer components to cross-link or monomers to polymerize. For example, the mixture may be heated to a temperature of between about 500° C. and 2000° C. or, more specifically, to between about 800° C. and 1200° C. This thermal treatment may be performed in an oxygen free environment or an ambient environment. When performed in the oxygen free environment, the thermal treatment may result in pyrolysis of the passivating material (e.g., if a polymer is used as a passivating material) and/or pyrolysis of the binding agents. Examples of suitable binding agents include polypropylene (PP), polyethylene (PE), polyvinyl chloride (PVC), polyvinyl acetate (PVA), poly acrylic acid (PAA), and poly acrylonitrile (PAN).

Figure 2A:
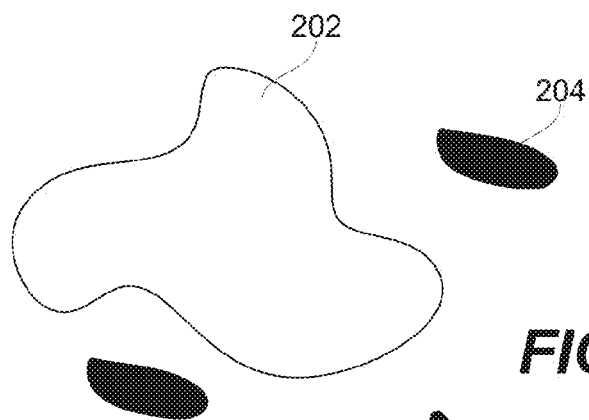
FIG. 2A illustrates an active material particle and passivating material particles prior to high shear mixing, in accordance with some embodiments.
Figure 2B:
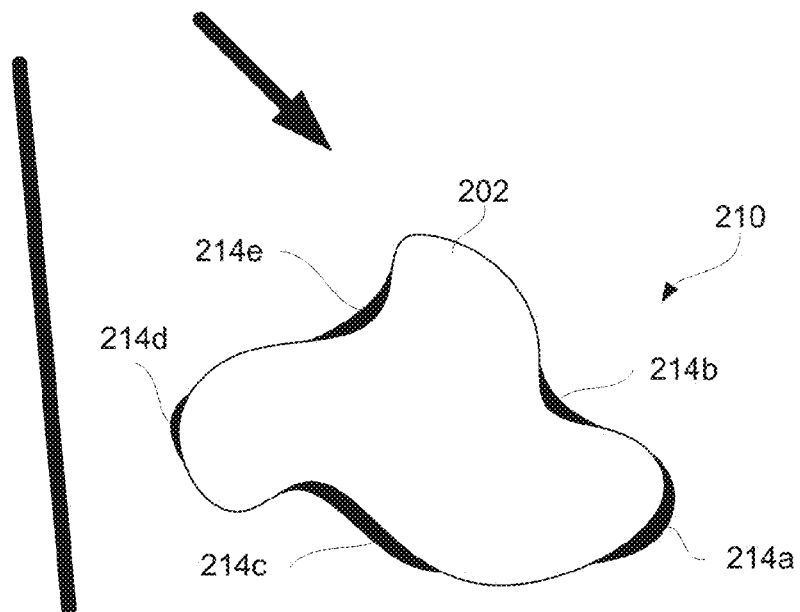
FIG. 2B illustrates a passivated active material particle having passivating material clusters deposited on the surface of the active material particle, in accordance with some embodiments.
Figure 2C:
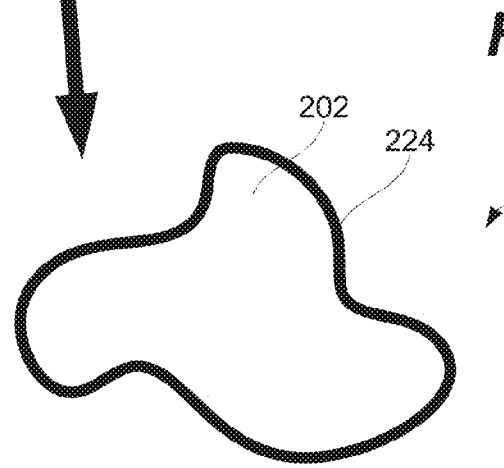
FIG. 2C illustrates a passivated active material particle having a continuous passivating layer deposited on the surface of the active material particle, in accordance with some embodiments.

High shear mixing during operation 104 deposits the passivating material on surfaces of the active material particles, thereby forming processed active material particles having passivated surfaces. FIG. 2A illustrates active material particle 202 and two passivating material particles 204 prior to high shear mixing. At this point, active material particle 202 and passivating material particles 204 are not bonded and may be agglomerated. FIG. 2B illustrates processed active material particle 210 including active material particle 202 and passivating material clusters 214a-214e deposited on the surface of active material particle 202. As shown, the passivating material particles may be dispersed and form new structures during mixing. In some embodiments, active material particles also change their shape and size during high shear mixing. After mixing, the passivating material forms a passivating layer on the active material particles. This passivating layer may be patchy as, for example, shown in FIG. 2B, or continuous as, for example, shown in FIG. 2C. With a patchy passivating layer, some surfaces of the active material particles remain exposed. In some embodiments, a ratio of the surface that remains exposed to the total surface area of active material particles is less than 50% or, more specifically, less than 25%, or even less than 1%. With a continuous layer, substantially all surfaces (e.g., more than 99%) of the active material particles are covered with passivating material. FIG. 2C illustrates a passivated active material particle 220 having a continuous passivating layer 224 formed on the surface of active material particle 202, in accordance with some embodiments.

In some embodiments, the high shear mixing may be performed using a set of three blades (e.g., a top blade, a middle blade, and a bottom blade). The top blade in this set directs the active material particles and the passivating material particles to the bottom blade during the high shear mixing. This feature prevents the mixed materials from being accumulated at the top of the container (e.g., near the lid). The bottom blade in the set directs the active material particles and the passivating material particles to the top blade during the high shear mixing. Finally, the middle blade, which is disposed between the top blade and the bottom blade, exerts a shear force on the active material particles and the passivating material particles during the high shear mixing. Additional examples of high shear mixing techniques include dry-blending, ball milling, jet milling, three roller milling, grinding, attrition milling, and cryo-milling (low temperature milling).

In some embodiments, additional materials (active material particles, passivating material particles, or) may be added to a dry mixture and high shearing mixing may be repeated as shown by decision block 106. For example, high shearing mixing may be performed in multiple stages with additional materials added one or times in between the mixing stages. In some embodiments, method 100 may proceed with forming a slurry from passivated active material particles during operation 108. In this operation, the passivated active material particles may be combined with a polymer binder and/or solvent. In some embodiments, a conductive additive, such as a carbon containing material, is also added into the slurry. It should be noted that the materials used during operation 108 may be the same as materials used during operations 102 and 104. For example, various carbon-containing materials may be used in both operations. However, these materials should not be confused as they operate in a different way in the electrode as further described with reference to FIG. 3.

It should be noted that attaching passivating material onto the surfaces of the active material particles may allow forming slurries with a greater solid content (e.g., 70% v. 78% for unprocessed conditions) while maintaining the same processing conditions (e.g., the viscosity of the slurry). The higher solid content reduces drying time and energy and, in some embodiments, makes a more compact electrode structure.

Method 100 may proceed with coating the slurry onto a substrate during operation 110, drying the slurry during operation 112, and pressing/slitting electrodes during operation 114. Most of the passivating material deposited onto the active material particles remains attached to these particles during all downstream operations. Experiments have shown that the passivating material can only be dislodged from the active material particles using very high energy processes (such as ultrasonic techniques) during subsequent operations. As such, the passivated active material particles remain relatively intact through typical electrode fabrication processes 108-114 and even subsequent fabrication and cell operation processes.

Figure 3:
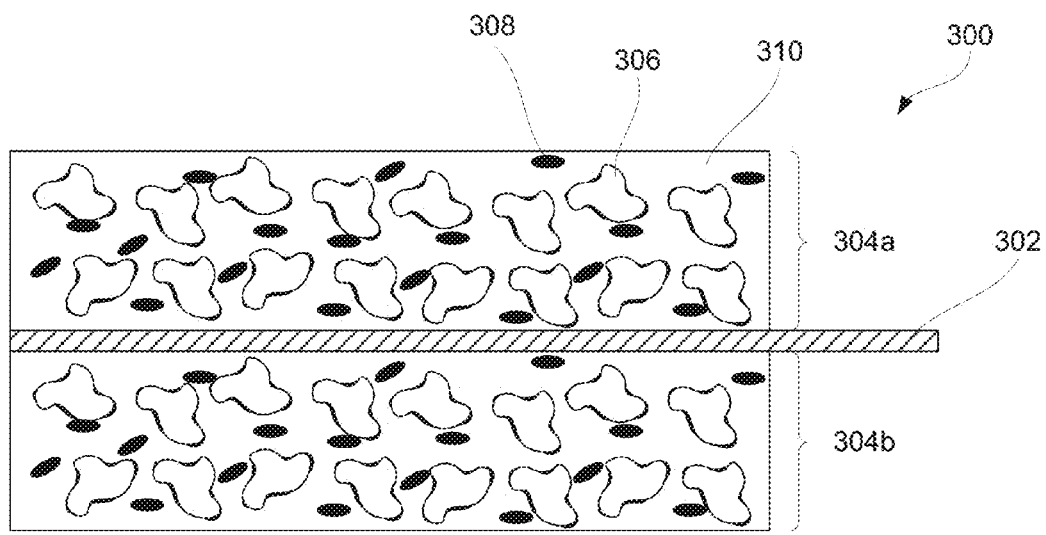
FIG. 3 illustrates a cross-section of a battery electrode including a current connecting substrate and two electrode layers having passivated active material particles, in accordance with some embodiments.

FIG. 3 illustrates a cross-section of a battery electrode 300 that includes a current collecting substrate 302 and two active material layers 304a and 304b, in accordance with some embodiments. Each active material layer 304a, 304b includes passivated active material particles 306 and, in some embodiments, other particles 308 (e.g., a conductive additive). A polymer binder 310 may be used to support passivated active material particles 306 and other particles 308 on the current collecting substrate 302.

Overall, this process may be used to minimize gassing of cells fabricated with various active materials, such as lithium titanate, by mechanically attaching inactive materials to the surface of the active material particles. Without being restricted to any particular theory, it is believed that covalent bonds between the passivating material and the reactive sites on the surfaces of active material surface particles may sometimes be formed. This approach could also be used to reduce surface reactivity in other active materials like lithium cobalt oxide, lithium nickel cobalt manganese oxide, and lithium nickel cobalt aluminum oxide, and to reduce electrolyte oxidation during cycling. It may be beneficial for high voltage systems for the same reason.

In some embodiments, lithium titanate is dry-blended with graphene to cover the surface of lithium titanate because the morphology of graphene is sheet or flake-like. In another example, a three roller mill may be used to grind KS6, plate-like graphite particles, onto lithium titanate particles and the composite used as active material. In yet another example, aluminum oxide and lithium titanate may be passed through a homogenizer in NMP, and then NMP may be dried away so the composite can be used as the active material. In another example, a plastic powder and lithium titanate are jet milled together and then carbonized in the furnace. Some of these examples may be combined and/or may be combined with the more general high shear mixing described above.

Examples of Cells

Figure 4:
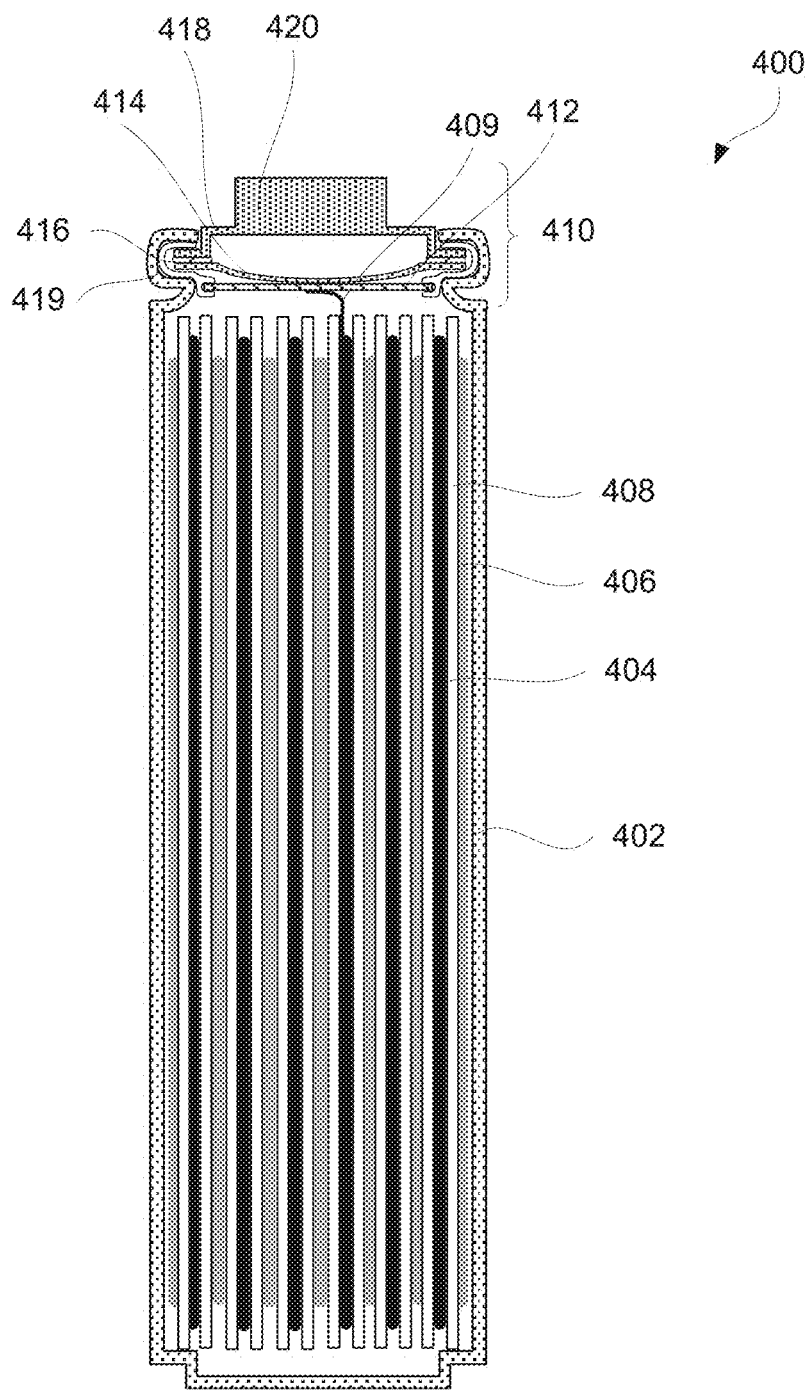
FIG. 4 illustrates a schematic cross-sectional view of an electrochemical cell, in accordance with some embodiments.

A brief description of a cell including cell connectors may help to better understand some features of battery packs with detachable cell connectors. FIG. 4 illustrates a schematic cross-section view of a wound cylindrical cell 400, in accordance with some embodiments. Positive electrode 406, negative electrode 404, and separator strips 408 may be wound into a so-called "jelly roll," which is inserted into a cylindrical case 402. Specifically, the jelly roll includes a spirally wound assembly of positive electrode 406, negative electrode 404, and two separator strips 408.

Case 402 may be rigid, particularly for lithium ion cells. Other types of cells may be packed into a flexible, foil-type (polymer laminate) case. A variety of materials can be chosen for case 402. Selection of case materials depends in part on a polarity of case 402. If case 402 is connected to positive electrode 406 as, e.g., show in FIG. 4, case 402 may be formed from titanium 6-4, other titanium alloys, aluminum, aluminum alloys, and 300-series stainless steel. On the other hand, if case 402 is connected to negative electrode 404, then case 402 may be made from titanium, titanium alloys, copper, nickel, lead, and stainless steels. In some embodiments, case 402 is neutral and may be connected to an auxiliary electrode made, for example, from metallic lithium. An electrical connection between case 402 and an electrode may be established by direct contact between case 402 and this electrode (e.g., an outer wind of the jelly roll), by a tab connected to the electrode and case 402, and other techniques. Case 402 may have an integrated bottom as shown in FIG. 4. Alternatively, a bottom may be attached to the case by welding, soldering, crimping, and other techniques. The bottom and the case may have the same or different polarities (e.g., when the case is neutral).

The top of case 402, which is used for insertion of the jelly roll, may be capped with header assembly 410. In some embodiments, header assembly 410 includes a weld plate 412, a rupture membrane 414, a positive thermal coefficient (PTC) washer 416, header cup 418, and insulating gasket 419. Weld plate 412, rupture membrane 414, PTC washer 416, and header cup 418 are all made from conductive material and are used for conducting electricity between an electrode (negative electrode 404 in FIG. 4) and cell connector 420 (integrated or attached to header cup 418 in FIG. 4). Insulating gasket 419 is used to support the conductive components of header assembly 410 and insulate these components from case 402. Weld plate 412 may be connected to the electrode by tab 409. One end of tab 409 may be welded to the electrode (e.g., ultrasonic or resistance welded), while the other end of tab 409 may be welded to weld plate 412. The centers of weld plate 412 and rupture membrane 414 are connected due to the convex shape of rupture membrane 414. If the internal pressure of cell 400 increases (e.g., due to electrolyte decomposition and other outgassing processes), rupture membrane 414 may change its shape and disconnect from weld plate 412, thereby breaking the electrical connection between the electrode and cell connector 420.

Header cup 418 is an external component of header assembly 410. It may be attached to or be integrated with cell connector 420. The attachment or integration may be performed prior to forming header assembly 410 and/or attaching header assembly 410 to case 402. As such, high temperatures, mechanical stresses, and other generally destructive characteristics may be used for this attachment and/or integration.

Types of electrochemical cells are determined by active materials used on the positive and negative electrodes as well as the composition of the electrolyte. Some examples of positive active materials include $Li(M'_xM''_y)O_2$, where M' and M'' are different metals (e.g., $Li(Ni_xMn_y)O_2$, $Li(Ni_{1/2}Mn_{1/2})O_2$, $Li(Cr_xMn_{1-x})O_2$, $Li(Al_xMn_{1-x})O_2$), $Li(Co_xM_{1-x})O_2$, where M is a metal, (e.g., $Li(Co_xNi_{1-x})O_2$ and $Li(Co_xFe_{1-x})O_2$), $Li_{1-W}(Mn_xNi_yCo_z)O_2$, (e.g., $Li(Co_xMn_yNi_{(1-x-y)})O_2$, $Li(Mn_{1/3}Ni_{1/3}Co_{1/3})O_2$, $Li(Mn_{1/3}Ni_{1/3}Co_{1/3-x}Mg_x)O2$, $Li(Mn_{0.4}Ni_{0.4}Co_{0.2})O_2$, $Li(Mn_{0.1}Ni_{0.1}Co_{0.8})O_2$,) $Li_{1-W}(Mn_xNi_xCo_{1-2x})O_2$, $Li_{1-W}(Mn_xNi_yCoAl_W)O_2$, $Li_{1-W}(Ni_x$-

$Co_YAl_Z)O_2$ (e.g., $Li(Ni_{0.8}Co_{0.15}Al_{0.05})O_2$), $Li_{1-W}(Ni_X\text{-}Co_YM_Z)O_2$, where M is a metal, $Li_{1-W}(Ni_XMn_YM_Z)O_2$, where M is a metal, $Li(Ni_{X-Y}Mn_YCr_{2-X})O_4$, $LiM'M''_2O_4$, where M' and M'' are different metals (e.g., $LiMn_{2-Y-Z}Ni_YO_4$, $LiMn_{2-Y-Z}Ni_YLi_ZO_4$, $LiMn_{1.5}Ni_{0.5}O_4$, $LiNiCuO_4$, $LiMn_{1-X}Al_XO_4$, $LiNi_{0.5}Ti_{0.5}O_4$, $Li_{1.05}Al_{0.1}Mn_{1.85}O_{4-Z}F_Z$, $Li_2MnO_3)Li_XV_YO_Z$, e.g., $LiV_3O_8$, $LiV_2O_5$, and $LiV_6O_{13}$, LiMPO4 where M is a metal; lithium iron phosphate (LiFePO$_4$) is a common example. Lithium iron phosphate (LiFePO$_4$) is both inexpensive and highly stable and safe because the relatively strong phosphate bonds tend to keep the oxygen in the lattice during overcharge, but it has poor conductance and requires substantial amounts of conductive additives, $LiM_XM''_{1-X}PO_4$ where M' and M'' are different metals (e.g. LiFePO$_4$), $LiFe_XM_{1-X}PO_4$, where M is a metal, $LiVOPO_4Li_3V_2(PO_4)_3$, LiMPO$_4$, where M is a metal such as iron or vanadium. Further, a positive electrode may include a secondary active material to improve charge and discharge capacity, such as $V_6O_{13}$, $V_2O_5$, $V_3O_8$, $MoO_3$, $TiS_2$, $WO_2$, $MoO_2$, and $RuO_2$.

The selection of positive electrode materials depends on several considerations, such as cell capacity, safety requirements, intended cycle life, and so forth. Lithium cobalt oxide (LiCoO$_2$) may be used in smaller cells that require higher gravimetric and/or volumetric capacities, such as portable electronics and medical devices. Cobalt may be partially substituted with Sn, Mg, Fe, Ti, Al, Zr, Cr, V, Ga, Zn, or Cu. Certain materials, such as lithium nickel oxide (LiNiO$_2$), may be less prone to thermal runaway. Furthermore, lithium manganese oxide has a relatively high power density because its three-dimensional crystalline structure provides more surface area, thereby permitting more ion flux between the electrodes.

Active materials may be deposited as layers on conductive substrates for delivering electrical current between the active materials and cell terminals. Substrate materials may include copper and/or copper dendride coated metal oxides, stainless steel, titanium, aluminum, nickel (also used as a diffusion barrier), chromium, tungsten, metal nitrides, metal carbides, carbon, carbon fiber, graphite, graphene, carbon mesh, conductive polymers, or combinations of the above (including multi-layer structures). The substrate material may be formed as a foil, film, mesh, laminate, wire, tube, particle, multi-layer structure, or any other suitable configuration. In one example, a substrate is a stainless steel foil having a thickness of between about 1 micrometer and 50 micrometers. In other embodiments, a substrate is a copper foil with a thickness of between about 5 micrometers and 30 micrometers. In yet another embodiment, a substrate is an aluminum foil with a thickness of between about 5 micrometers and 50 micrometers.

In some embodiments, a separator material may include a fabric woven from fluoro-polymeric fibers of polyethylenetetrafluoroethylene (PETFE) and polyethylenechlorotrifluoroethylene used either by itself or laminated with a fluoropolymeric microporous film. Moreover, separator materials may include, polystyrenes, polyvinyl chloride polypropylene, polyethylene (including LDPE, LLDPE, HDPE, and ultra high molecular weight polyethylene), polyamides, polyimides, polyacrylics, polyacetals, polycarbonates, polyesters, polyetherimides, polyimides, polyketones, polyphenylene ethers, polyphenylene sulfides, polymethylpentene, polysulfone non-woven glass, glass fiber materials, ceramics, a polypropylene membrane commercially available under the designation CELGARD from Celanese Plastic Company, Inc. in Charlotte, N.C., USA, as well as Asahi Chemical Industry Co. in Tokyo, Japan, Tonen Corporation, in Tokyo, Japan, Ube Industries in Tokyo, Japan, and Nitto Denko K.K. in Osaka, Japan. In one embodiment, a separator includes copolymers of any of the foregoing and mixtures thereof.

A typical separator has the following characteristic: air resistance (Gurley number) of less than about 800 seconds, or less than about 500 seconds in a more specific embodiment; thickness of between about 5 µm and 500 µm or, in a specific embodiment, between about 10 µm and 100 µm, or more specifically between about 10 µm and 30 µm; pore diameters ranging from between about 0.01 µm and 5 µm or, more specifically, between about 0.02 µm and 0.5 µm; and porosity ranging from between about 20% and 85% or, more specifically, between about 30% and 60%.

The electrolyte in lithium ions cells may be liquid, solid, or gel. Lithium ion cells with a solid electrolyte are also referred to as lithium polymer cells. A typical liquid electrolyte includes one or more solvents and one or more salts, at least one of which includes lithium. During the first charge cycle (sometimes referred to as a formation cycle), the organic solvent in the electrolyte can partially decompose on the negative electrode surface to form a solid electrolyte interphase layer (SEI layer). The interphase is generally electrically insulating but ionically conductive, allowing lithium ions to pass through. The interphase also prevents decomposition of the electrolyte in the later charging sub-cycles.

Some examples of non-aqueous solvents suitable for some lithium ion cells include the following: cyclic carbonates (e.g., ethylene carbonate (EC), propylene carbonate (PC), butylene carbonate (BC) and vinylethylene carbonate (VEC)), lactones (e.g., gamma-butyrolactone (GBL), gamma-valerolactone (GVL) and alpha-angelica lactone (AGL)), linear carbonates (e.g., dimethyl carbonate (DMC), methyl ethyl carbonate (MEC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane), nitrites (e.g., acetonitrile and adiponitrile) linear esters (e.g., methyl propionate, methyl pivalate, butyl pivalate and octyl pivalate), amides (e.g., dimethyl formamide), organic phosphates (e.g., trimethyl phosphate and trioctyl phosphate), organic compounds containing an S=O group (e.g., dimethyl sulfone and divinyl sulfone), and combinations thereof.

Examples of solvents that may be present in the initial electrolyte include cyclic carbonates (e.g., ethylene carbonate (EC) and propylene carbonate (PC)), linear carbonates (e.g., dimethyl carbonate (DMC), diethyl carbonate (DEC), and ethylmethyl carbonate (EMC)), and fluorinated versions of the cyclic and linear carbonates (e.g., monofluoroethylene carbonate (FEC)). Furthermore, non-carbonate solvents, such as sulfones, nitriles, dinitriles, carboxylates, and ethers, may be used.

Non-aqueous liquid solvents can be employed in combination. Examples of combinations include combinations of cyclic carbonate-linear carbonate, cyclic carbonate-lactone, cyclic carbonate-lactone-linear carbonate, cyclic carbonate-linear carbonate-lactone, cyclic carbonate-linear carbonate-ether, and cyclic carbonate-linear carbonate-linear ester. In one embodiment, a cyclic carbonate may be combined with a linear ester. Moreover, a cyclic carbonate may be combined with a lactone and a linear ester. In a specific embodiment, the ratio of a cyclic carbonate to a linear ester is between about 1:9 to 10:0, preferably 2:8 to 7:3, by volume.

A salt for liquid electrolytes may include one or more of the following: $LiPF_6$, $LiBF_4$, $LiClO_4LiAsF_6$, $LiN(CF_3SO_2)_2$, $LiN(C_2F_5SO_2)_2$, $LiCF_3SO_3$, $LiC(CF_3SO_2)_3$, $LiPF_4(CF_3)_2$, LiPF$_3$(C$_2$F$_5$)$_3$, LiPF$_3$(CF$_3$)$_3$, LiPF$_3$(iso-C$_3$F$_7$)$_3$, LiPF$_5$(iso-C$_3$F$_7$), lithium salts having cyclic alkyl groups (e.g., (CF$_2$)$_2$(SO$_2$)$_{2x}$Li and (CF$_2$)$_3$(SO$_2$)$_{2x}$Li), and combinations of thereof. Common combinations include LiPF$_6$ and LiBF$_4$, LiPF$_6$ and LiN(CF$_3$SO$_2$)$_2$, and LiBF$_4$ and LiN(CF$_3$SO$_2$)$_2$.

In one embodiment, the total concentration of salt in a liquid non-aqueous solvent (or combination of solvents) is at least about 0.3M; in a more specific embodiment, the salt concentration is at least about 0.7M. The upper concentration limit may be driven by a solubility limit or may be no greater than about 2.5M (in a more specific embodiment, no more than about 1.5M).

Experimental Results

Figure 5A:
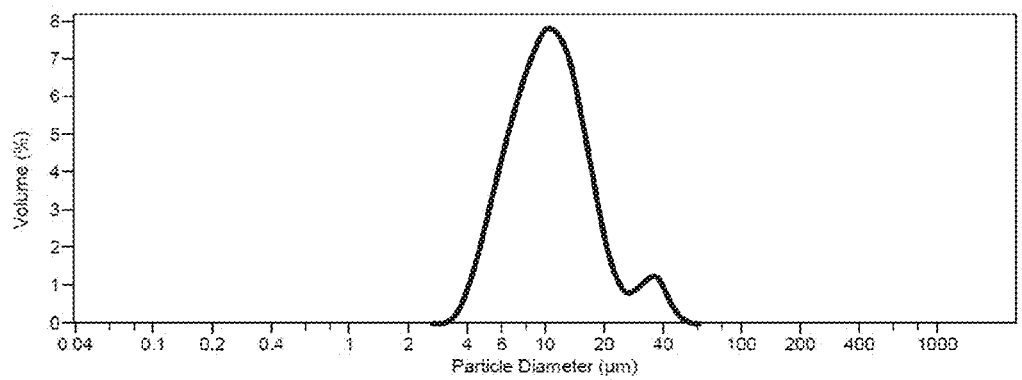
FIG. 5A is a particle diameter graph obtained using particle size analysis (PSA) of lithium titanate particles prior to mixing these particles with carbon particles.
Figure 5B:
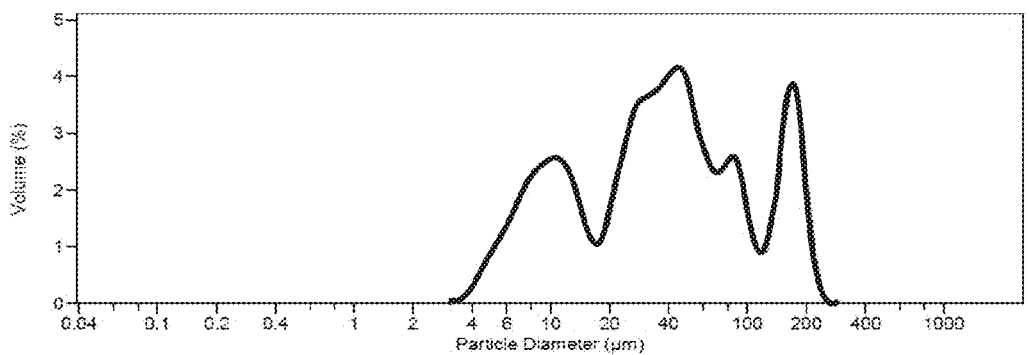
FIG. 5B is a particle diameter graph obtained using PSA of carbon particles prior to mixing these particles with lithium titanate particles.
Figure 5C:
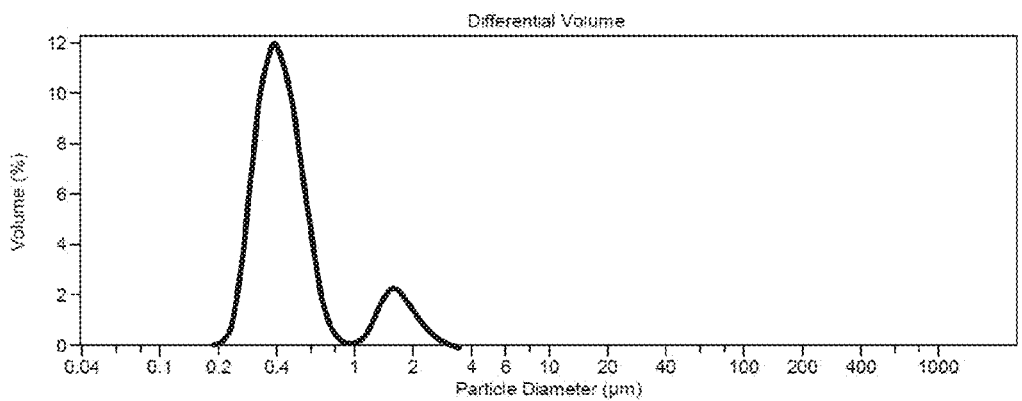
FIG. 5C is a particle diameter graph obtained using PSA of passivated active material particles formed by mixing the lithium titanate particles (represented in FIG. 5A) with the carbon particles (represented in FIG. 5B).
Figure 6:
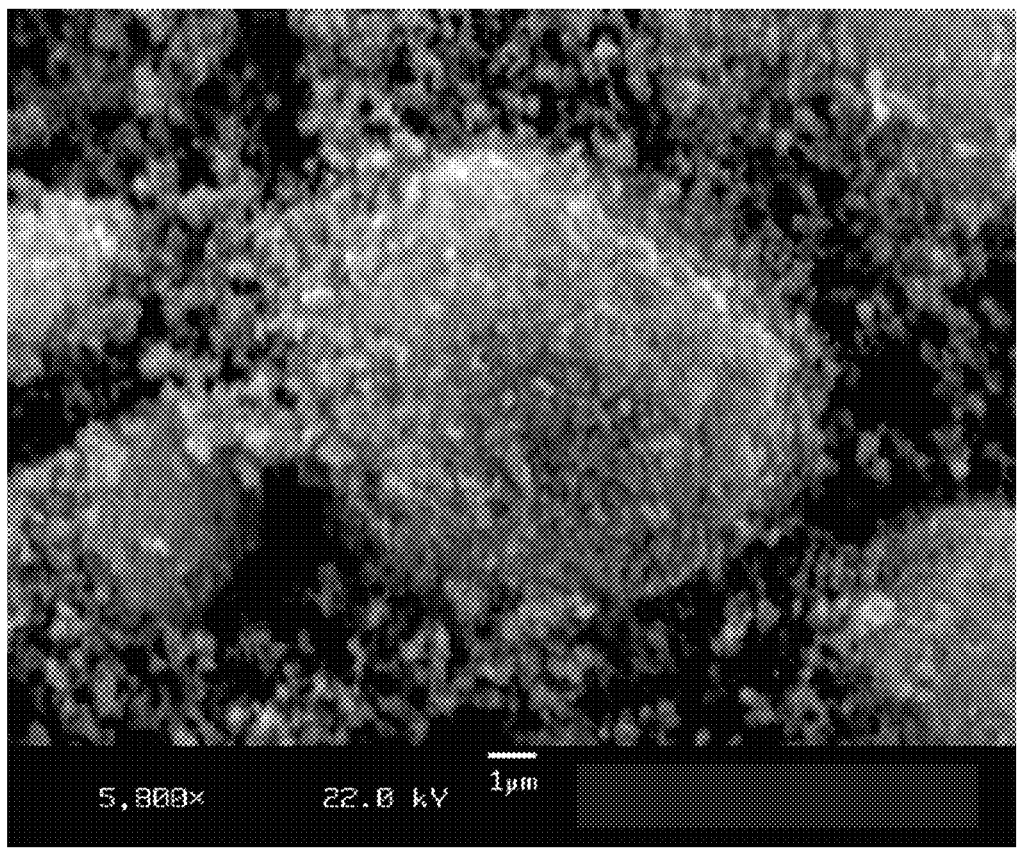
FIG. 6 is a scanning electron microscope (SEM) image of the passivated active material particles formed by mixing the lithium titanate particles with the carbon particles.

In one experiment, particle sizes were analyzed before and after dry mixing. Lithium titanate was used as an active material, while carbon (Super P) was used as a passivating material in this experiment. FIG. 5A is a particle diameter graph obtained using PSA of lithium titanate particles prior to mixing these particles with carbon particles. The average particle size was about 10 microns. FIG. 5B is a particle diameter graph obtained using PSA of carbon particles prior to mixing these particles with lithium titanate particles. The average particle size was about 40 microns with a wide distribution of sizes from about 10 microns to about 200 microns. Finally, FIG. 5C is a particle diameter graph obtained using PSA of passivated active material particles formed by mixing the lithium titanate particles (represented in FIG. 5A) with the carbon particles (represented in FIG. 5B). The average particle size was about 0.4 microns. As such, the mixing operation dispersed agglomerates in both materials. It is believed that the 0.4 micron peak in FIG. 5C is attributed to passivated lithium titanate particles and that substantially all carbon is attached to the lithium titanate particles. FIG. 6 is a SEM image of the passivated active material particles formed by mixing the lithium titanate particles with the carbon particles. This SEM image supports the above position that substantially all carbon is attached to the lithium titanate particles.

In another experiment, two sets of electrochemical cells were constructed using passivated active material particles. The first set included lithium titanate particles as the active material and graphene nano-plates as the passivating material. Unlike activated carbon particles, which are commonly used in slurries during fabrication of lithium ion cells and which have mostly spherical or needle-like shapes, the graphene used in this experiment has a plate-like shape and is believed to provide better coverage to the lithium titanate particles by minimizing the void space between the stack of particles. The lithium titanate to graphene weight ratio was 17:1. This weight ration corresponded to the graphene to lithium titanate surface area ratio of 2.2. In order to ensure complete coverage of the lithium titanate particles with graphene, the surface area of lithium titanate particles (i.e., the covering material) has to be at least twice as much as the surface area of the graphene particles (i.e., the covered material) since the covering material both forms an interface with the covered material and forms an external surface of the combination. After mixing, the combination of the lithium titanate particles and the graphene particles had an average particle size of 0.55 micrometers, which was a significant reduction from the original particle size of 8 micrometers for the lithium titanate particles. This reduction in size was attributed to breaking aggregates originally formed by the lithium titanate particles. The combination of the lithium titanate particles and the graphene particles had a combined surface area of 7.2 m$^2$/g, which was a significant reduction from 52.8 m$^2$/g representing the sum of the surface areas of the two original materials before mixing (i.e., the lithium titanate particles and the graphene particles). The surface area reduction is an evidence of adherence of graphene to the lithium titanate and the formation of interfaces between these two materials, which reduces the total external surface area.

The second set of electrochemical cells included lithium titanate particles as the active material and fume silica as the passivating material. Compared to the graphene nano-plates, which are mostly flat and densely packed, fume silica is porous and thus has a high surface area of greater than 500 m$^2$/g. After mixing, fume silica covered some surfaces of the lithium titanate particles but also left many uncovered surfaces. The weight ratio of lithium titanate to fume silica was 32:1, which corresponded to the surface area ratio of fume silica to lithium titanate of about 2.3. After mixing, the combination of lithium titanate and fume silica had an average particle size of 0.51 micrometers, which also indicates that most of the lithium titanate agglomerates were dispersed. This combination had a combined surface area of 9.3 m$^2$/g, which was also a significant reduction from the 25.9 m$^2$/g representing the sum of the surface areas of the two original materials before mixing (i.e., the lithium titanate particles and the fume silica particles). However, due to the porous nature of fume silica, the external surface area is still larger than in the first set, in which the lithium titanate particles were combined with the graphene particles.

Figure 7:
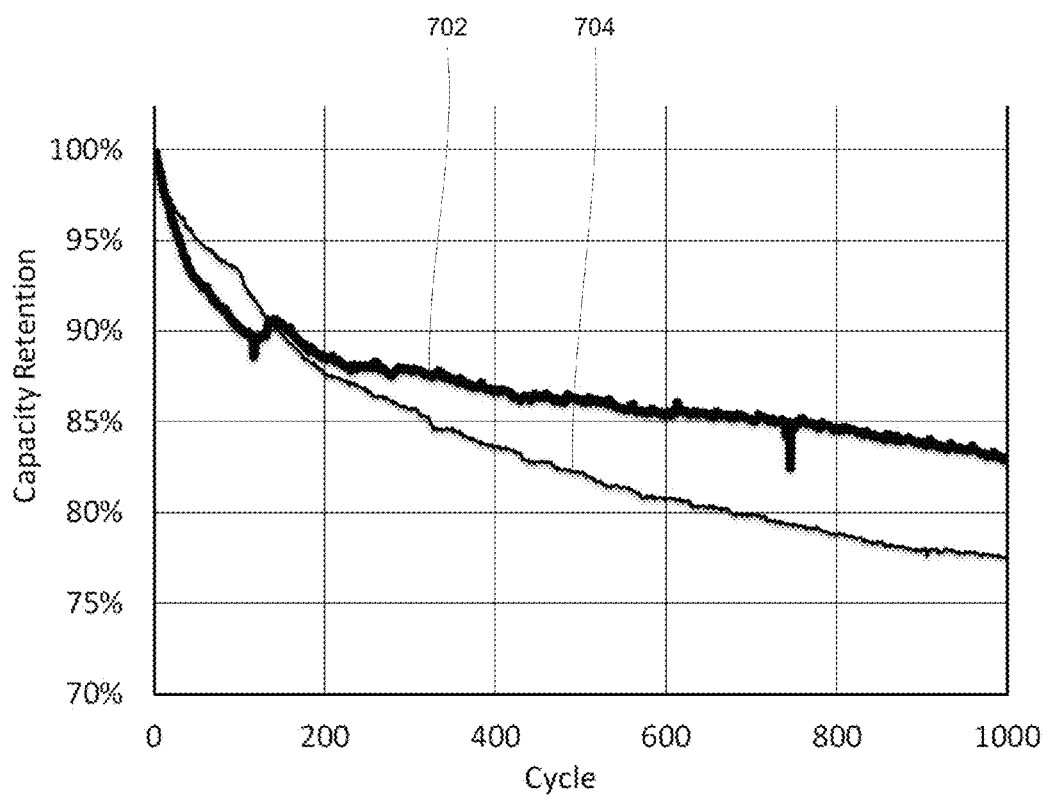
FIG. 7 is cycle life data of two cells including a cell prepared using lithium titanate particles mixed with graphene nano-plates and another cell prepared using lithium titanate particles mixed with fumed silica particles.

Both sets of cells were subject to a cycle life test, and the results of that test are presented in FIG. 7. Line 702 corresponds to the first set (i.e., the combination of lithium titanate particles and graphene particles), while line 704 corresponds to the second set (i.e., the combination of lithium titanate particles and fume silica particles). While the first set had a higher initial drop in capacity, it also had a lower fade in subsequent cycles in comparison to the second set. This high initial drop is believed to be a result of a SEI stabilization process at the charged state associated with the high surface area graphitic material. However, graphene passivation of the lithium titanate particles slowed down the degradation process compared to the porous fume silica passivation. With the porous fume silica, the contact area between the low potential lithium titanate surface and the electrolyte remains high, and this may be the cause of this high degradation rate.

In another test, lithium titanate particles were used as the active material and carbon (SUPER P® available from TIMCAL Ltd in Bodio, Switzerland) was used as the passivating material. Compared to the graphene nano-plates, which are mostly flat and densely packed, SUPER P® is needle-like one dimensional structure and has a surface area of about 60 m$^2$/g. While SUPER P® provides a good conductivity, it leaves many uncovered surfaces on the lithium titanate particles. The weight ratio of lithium titanate to SUPER P® was 8:1, which corresponded to the surface area ratio of SUPER P® to lithium titanate of about 0.9. After mixing, the combination of lithium titanate and fume silica had an average particle size of 0.6 micrometers, which also indicates that most of the lithium titanate agglomerates were dispersed. This combination had a combined surface area of 8.5 m$^2$/g, which was also some reduction from the 13.8 m$^2$/g representing the sum of the surface areas of the two original materials before mixing (i.e., the lithium titanate particles and SUPER P® particles). However, due to poor coverage of SUPER P®, the external surface area is still larger than in the first set described above, in which the lithium titanate particles were combined with the graphene particles. This set of cells (lithium titanate particles+SUPER PC)) was also cycles using the same conditions as the two sets described above. The capacity retention after 100 cycles for lithium titanate particles+SUPER P® was about 80%, for lithium titanate particles+graphene particles was about 83%, while for lithium titanate particles+fumed silica particles was only about 78%. Overall, effectiveness of passivating materials to active materials depends on the surface coverage of the active materials, which in turn depends on the properties of the passivating materials. Comparing the cycling life test results of the titanate particles+graphene particles cells with the lithium titanate particles+SUPER P® cells, it is clear that two dimensional particles perform better than similar one dimensional particles due, at least in part, to better surface coverage of the two dimensional particles.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. A method of passivating active materials for use in electrochemical cells, the method comprising:
    combining active material particles and passivating material particles,
        wherein the active material particles comprise one or more materials selected from the group consisting of lithium titanate ($Li_4Ti_5O_{12}$), lithium cobalt oxide ($LiCoO_2$), lithium nickel cobalt aluminum oxide ($LiNi_{0.85}Co_{0.1}Al_{0.05}O_2$), lithium nickel cobalt manganese oxide ($LiNi_{1/3}Co_{1/3}Mn_{1/3}O_2$), lithium manganese oxide ($LiMn_2O_4$), lithium iron phosphate ($LiFePO_4$), lithium manganese iron phosphate, lithium cobalt phosphate, spinel lithium nickel manganese oxide, layered lithium nickel manganese oxide, lithium- and manganese-rich transition metal layered-oxides (LMR-NMC), and lithium iron silicate ($Li_2FeSiO_4$),
    mixing a combination of the active material particles and the passivating material particles using high shear mixing,
    wherein during mixing the combination of the active material particles and the passivating material particles has a solid content of at least about 99%,
    wherein mixing forms a passivating layer on the active material particles, the passivating layer comprising a material of the passivating material particles,
    wherein a total surface ratio of the passivating material particles relative to the active material particles is between 1 and 5.

2. The method of claim 1, wherein the passivating material particles comprise one or more materials selected from the group consisting of a carbon-containing material, a ceramic, and a polymer.

3. The method of claim 1, wherein the passivating material particles comprise one or more carbon-containing materials selected from the group consisting of carbon black, activated carbon, hard carbon, soft carbon, meso carbon micro beads (MCMB), graphite, graphene, and carbon nanotubes (CNT).

4. The method of claim 1, wherein the passivating material particles comprise graphene nano-plates.

5. The method of claim 1, wherein the passivating material particles comprise one or more carbon-containing materials having one or more morphology structures selected from the group consisting of a needle-like structure, a plate-like structure, a spherical structure, and an irregular structure.

6. The method of claim 1, wherein the passivating material particles comprise one or more ceramics selected from the group consisting of aluminum oxide ($Al_2O_3$), silicon oxide ($SiO_2$), titanium oxide ($TiO_2$), and molybdenum oxide ($MoO_3$).

7. The method of claim 1, wherein the passivating material particles comprise one or more polymers having a main chain length of at least about 50,000.

8. The method of claim 1, wherein the passivating material particles comprise one or more polymers selected from the group consisting of polypropylene (PP), polyethylene (PE), polyvinyl chloride (PVC), polyvinyl acetate (PVA), poly acrylic acid (PAA), and poly acrylonitrile (PAN).

9. The method of claim 1, wherein the passivating material particles have a two-dimensional shape.

10. The method of claim 1, wherein the active material particles comprise lithium titanate ($Li_4Ti_5O_{12}$).

11. The method of claim 1, wherein a combined average surface area of the active material particles and the passivating material particles is reduced during mixing.

12. The method of claim 1, wherein a combined average surface area of the active material particles and the passivating material particles is reduced by at least about 5 times during mixing.

13. The method of claim 1, wherein a weight ratio of the passivating material particles relative to the active material particles in the combination is between about 0.01 and 0.1.

14. The method of claim 1, wherein the high shear mixing is performed using a set of three blades including a top blade, a bottom blade, and a middle blade,
    wherein the top blade directs the active material particles and the passivating material particles toward the bottom blade during the high shear mixing,
    wherein the bottom blade directs the active material particles and the passivating material particles toward the top blade during the high shear mixing; and
    wherein the middle blade exerts a shear force on the active material particles and the passivating material particles during the high shear mixing,
    the middle blade disposed between the top blade and the bottom blade.

15. The method of claim 1, wherein the high shear mixing comprises one or more techniques selected from the group of dry-blending, ball milling, jet milling, three roller milling, grinding, attrition milling, and cryo-milling.

16. The method of claim 1, further comprising, after mixing the combination of the active material particles and the passivating material particles using high shear mixing, adding a polymer binder to the combination, thereby forming a slurry.

17. The method of claim 16, further comprising coating the slurry on a current collector substrate.

18. The method of claim 16, further comprising adding a carbon-containing material to the slurry.

19. A passivated active material comprising:
    active material particles comprising lithium titanate ($Li_4Ti_5O_{12}$); and
    a passivating layer disposed on a surface of the active material particles,
        wherein the passivating layer comprises a carbon-containing material; and
        wherein a weight ratio of the passivating layer to the active material particles is between about 0.01 and 0.1; and
        wherein a total surface ratio of the passivating layer relative to the active material particles is between 1 and 5.

20. A method of passivating active materials for use in electrochemical cells, the method comprising:

combining active material particles and passivating material particles,
  wherein the active material particles comprise one or more materials selected from the group consisting of lithium titanate ($Li_4Ti_5O_{12}$), lithium cobalt oxide ($LiCoO_2$), lithium nickel cobalt aluminum oxide ($LiNi_{0.85}Co_{0.1}Al_{0.05}O_2$), lithium nickel cobalt manganese oxide ($LiNi_{1/3}Co_{1/3}Mn_{1/3}O_2$), lithium manganese oxide ($LiMn_2O_4$), lithium iron phosphate ($LiFePO_4$), lithium manganese iron phosphate, lithium cobalt phosphate, spinel lithium nickel manganese oxide, layered lithium nickel manganese oxide, lithium- and manganese-rich transition metal layered-oxides (LMR-NMC), and lithium iron silicate ($Li_2FeSiO_4$), mixing a combination of the active material particles and the passivating material particles using high shear mixing, wherein during mixing the combination of the active material particles and the passivating material particles has a solid content of at least about 99%, wherein mixing forms a passivating layer on the active material particles, the passivating layer comprising a material of the passivating material particles, wherein the high shear mixing is performed using a set of three blades including a top blade, a bottom blade, and a middle blade, wherein the top blade directs the active material particles and the passivating material particles toward the bottom blade during the high shear mixing, wherein the bottom blade directs the active material particles and the passivating material particles toward the top blade during the high shear mixing, and wherein the middle blade exerts a force on the active material particles and the passivating material particles during the high shear mixing, wherein the middle blade is disposed between the top blade and the bottom blade.

\* \* \* \* \*